US005097006A

United States Patent [19]
Kapilow et al.

[11] Patent Number: 5,097,006
[45] Date of Patent: Mar. 17, 1992

[54] WEATHERABLE POWDER COATING COMPOSITIONS

[75] Inventors: Lorraine Kapilow, Rye; Joseph S. Puglisi, Crompond; Chi-Wen F. Cheng, New City, all of N.Y.

[73] Assignee: U C B S.A., Brussels, Belgium

[21] Appl. No.: 616,552

[22] Filed: Nov. 21, 1990

[51] Int. Cl.⁵ .............................................. C08G 63/02
[52] U.S. Cl. ................................... 528/272; 528/274; 528/296; 528/297; 528/307; 528/367; 525/437; 525/440; 525/449; 524/91; 524/714; 524/770; 524/773
[58] Field of Search ............... 528/272, 274, 296–297, 528/307, 367; 525/437, 440, 449; 524/91, 714, 770, 773

[56] References Cited

U.S. PATENT DOCUMENTS

| 4,352,924 | 10/1982 | Wooten et al. | 528/302 |
| 4,525,504 | 6/1985 | Morris et al. | 524/99 |
| 4,897,453 | 1/1990 | Flora et al. | 529/439 |
| 4,904,748 | 2/1990 | Seymour et al. | 525/444 |
| 4,918,156 | 4/1990 | Rogers | 528/272 |
| 4,920,008 | 4/1990 | Barbee | 428/458 |
| 5,017,679 | 5/1991 | Chang et al. | 528/272 |

Primary Examiner—John Kight, III
Assistant Examiner—S. A. Acquah
Attorney, Agent, or Firm—Wenderoth, Lind & Ponack

[57] ABSTRACT

Carboxyl-terminated and hydroxyl-terminated aliphatic polyester compositions derived from 1,4-cyclohexanedicarboxylic acid, and a glycol component comprising primarily of cycloaliphatic diols and modifying aliphatic glycols, said polyesters being optionally stabilized by the presence of ultraviolet light absorbing compounds and/or hindered amine light stabilizers and being used in powder coating formulations to provide improved weatherability thereto.

18 Claims, No Drawings

WEATHERABLE POWDER COATING COMPOSITIONS

Thermosetting polyesters for use in powder coatings are well known. Such materials are conventionally prepared from aromatic difunctional carboxylic acids with possible inclusion of aliphatic dicarboxylic acid moieties and various diols e.g. ethylene glycol, diethylene glycol, 1,4 butanediol, neopentyl glycol, etc. Carboxyl-functional polyesters are usually prepared from an excess of dicarboxylic acid with respect to the diols or frequently by introduction of an anhydride in a second stage reaction of OH groups on a preformed polyester polymer. Correspondingly, hydroxyl-functional polyesters are typically prepared by utilizing an excess of diol(s) with respect to the dicarboxylic acids. The polyesters described above are generally amorphous with Tg's in the vicinity of 50°-80° C.

A large number of patents have issued which disclose different variations of the aforementioned polyesters. These include U.S. Pat. No. 4,147,737, which describes a carboxylic acid-containing polyester amenable to curing with polyepoxides and U.S. Pat. No. 3,868,338 which discloses OH-functional polyesters for powder coatings containing a substantial amount of 2,2,4-trimethyl-pentane-1,3-diol co-reactant, which are cured in the presence of a melamine-formaldehyde resin and a blocked acid catalyst.

Polyesters which are crystalline and possess excellent flow at the melting point of the polymer have also been described, e.g. U.S. Pat. No. 4,387,214 and U.S. Pat. No. 4,442,270. Such polyesters are based on a substantial portion of terephthalic acid together with preponderantly 1,6-hexanediol as the dihydric alcohol. Crystalline polyesters derived from trans-1,4-cyclohexane dicarboxylic acid and 1,4-butanediol, characterized by a hydroxyl number of about 35-160, are described in U.S. Pat. No. 4,352,924.

Stabilized polyester compositions for outdoor applications have been described in U.S. Pat. No. 4,525,504 wherein 1,4-cyclohexane dicarboxylic acid as the chief dicarboxylic acid component is reacted with 2,2,4,4-tetramethyl-1,3-cyclobutanediol as the major glycol component to form the basic polyester resin which is then stabilized with hindered amine light stabilizers in combination with conventional ultraviolet light absorbers.

Polyesters for top coat applications are described in European Patent Application 0211625. They are based on the use of alicyclic dicarboxylic acids such as 1,4-cyclohexane dicarboxylic acid in conjunction with ε-caprolactone-modified high molecular weight resins prepared from terephthalic acid as a typical co-reactant and various glycols.

Finally, polyester-based thermosetting compositions are disclosed in U.S. Pat. No. 4,740,566 wherein the polyester is prepared by the reaction of dimethyl 1,4-dicyclohexanedicarboxylate, dicarboxylic acids and a branched-chain glycol and is then combined with an aminoplast resin curing or crosslinking agent and an epoxy resin.

While these various systems have provided beneficial performance characteristics, there is a continuing need for improved polyester compositions for use in powder coating applications. These areas of desired improvement include weatherability, i.e. resistance to degradation and retention of physical properties upon exposure to outdoor conditions, good processability, increased flow, higher impact strengths, ease of use in powder coating application techniques and possession of appropriate physical characteristics, e.g. glass transition temperatures for powder coating applications.

It is accordingly the primary object of this invention to provide improved polyester compositions for use in powder coating applications.

It is a further object to provide such compositions which exhibit particular improvement in weatherability, ease of application, breadth of use, impact strength, appearance, and the like.

Various other objects and advantages of this invention will become apparent from the following descriptions.

It has now been determined that polyester-based powder coatings prepared from prescribed diacid and polyol components exhibit a broad range of improved performance characteristics. Thus, such carboxyl-terminated or hydroxyl-terminated aliphatic polyesters are derived from 1,4-cyclohexane dicarboxylic acid and a glycol component comprised primarily of cycloaliphatic diols such as hydrogenated bisphenol A optionally combined with one or more light stabilizers. In particular, the use of the cycloaliphatic diols allows for higher glass transition temperatures, enhanced weatherability, ease of processability and the like. The stabilizer systems provide added resistance to the adverse effects of heat, light and oxygen. Accordingly, the resulting compositions are able to withstand extended exposure to accelerated weathering conditions with excellent retention of physical properties and characteristics as well as to exhibit excellent processing, application and adhesion properties. Additional benefits provided by the hydroxyl and carboxyl-terminated materials are high flow and smooth appearance and particularly surprising by both types of materials are the unexpected combination of weatherability and high impact strength, i.e. increased flexibility, in the final coatings product.

According to the invention, the carboxyl-terminated and hydroxyl-terminated aliphatic polyesters comprise
(1) 1,4-cyclohexane dicarboxylic acid as the acid moiety;
(2) a glycol component wherein 12-100 equivalent % is hydrogenated bisphenol A and/or a cycloaliphatic diol; and
(3) optionally, effective stabilizing amounts of light stabilizers as recited hereinafter.

The 1,4-cyclohexane dicarboxylic acid used as the acid moiety will generally be present as a 1:1 cis:trans isomeric mixture.

The glycol component includes 12-100 equivalent % of hydrogenated bisphenol A and/or a cycloaliphatic diol, and preferably 30 to 70 equivalent %. Typical cycloaliphatic diols include 2,2,4,4-tetramethyl 1,3 cyclobutanediol, tricyclodecane dimethanol, 1,4-cyclohexanedimethanol and 1,4-cyclohexane diol.

Optional glycol component modifiers can be branched chain glycols, polyols of 2-10 carbon atoms, and aliphatic triols. Typical modifiers include ethylene glycol, diethylene glycol, propylene glycol, butylene glycol, 1,6-hexane diol, neopentyl glycol, trimethylolpropane, trimethylolethane, tris(2-hydroxy ethyl)-isocyanurate, and the like. Mixtures of neopentyl glycol and trimethylolpropane are preferred for purposes of this invention with the neopentyl glycol facilitating appropriate melt viscosity and glass transition temperatures and the trimethylolpropane providing increased functionality. Appropriate concentrations of modifier are 0–88 equivalent %, and preferably 20 to 70 equivalent %. Combinations of neopentyl glycol and trimethylolpropane are generally used in a equivalent % ratio of 50 to 65. The benefits of the presence of hydrogenated bisphenol A include improved weatherability, manufacture of solid polyesters with glass transition temperatures suitable for powder coatings and facilitation of the synthesis of solid, amorphous carboxyl-functional and hydroxyl-functional polyester resins.

The various acids and glycols identified above are available commerically or can be prepared by well-known procedures.

The polyesters useful in this invention are prepared according to procedures known in the art whereby a dicarboxylic acid is esterified with a glycol/polyol mixture under conditions of temperature, catalysis, and vacuum to form the polymeric material. Reaction catalysts include dibutyl tin oxide, dibutyl tin dilaurate, butyl tin trioctanoate, sulfuric acid or a sulfonic acid. Reaction temperatures generally range from 140° to 225° C.

The polyesters are characterized by the presence of free carboxyl groups resulting from the use of an excess of acid moieties relative to the glycol component. Such excesses range from 2 to 15 equivalent % above the stoichiometric amount to give acid numbers between 15 and 60 mg KOH/g. Correspondingly, they may be characterized by the presence of free hydroxyl groups resulting from the use of an excess of hydroxyl moieties relative to the acid component. Such excesses range from 2 to 15 equivalent % above the stoichiometric amount to give hydroxyl numbers between 15 and 60 mg KOH/g. Melt viscosities of the polyesters of this invention are in the range of 15–100 poise using an ICI melt viscosimeter @200° C. Glass transition temperatures (Tg) are typically 45°–70° C.

As an optional feature of the invention, catalysts which facilitate the carboxyl group reaction during curing of the polyester composition may be added to the reaction melt after esterfication. Various phosphonium salts serve this function and, unexpectedly, contribute to certain improved performance characteristics of the final polyester composition, e.g. impact strength and flexibility.

Color stabilizers are included in the polyester composition during the preparation of the polyester, while light stabilizers can be post-added to the polyester formulation.

The color stabilizers found to be useful in the polyester preparative step are exemplified by phenolic antioxidants and various phosphite and phosphonite process stabilizers. For the formulation of the polyester, U.V. light absorbers represented by Tinuvin 900 (Ciba-Geigy Corp.) and hindered amine light stabilizers represented by Tinuvin 144 (Ciba-Geigy Corp.) are useful.

The phenolic antioxidants employed in the preparation of the polyesters of this invention are those typically used in the stabilization of polyolefins. It is preferred that the phenolic antioxidant be hindered and relatively nonvolatile. Examples of suitable hindered phenolic antioxidants include 1,3,5-tris(3,5-di-tert-butyl-4-hydroxybenzyl)-s-triazine-2,4,6-(1H, 3H, 5H)-trione; 3,5-di-tert-butyl-4-hydroxyhydrocinnamic acid triester with 1,3,5-tris-(2-hydroxyethyl)-s-triazine-2,4,6-(1H, 3H, 5H)-trione; O,O-di-n-octadecyl-3,5-di-tert-butyl-4-hydroxybenzyl phosphonate; octadecyl 3,5-di-tert-butyl-4-hydroxyhydrocinnamate; thiodiethylene bis(3,5-di-tert-butyl-4-hydroxy)hydrocinnamate; N,N'-hexamethylene-bis(3,5-di-tert-butyl-4-hydroxyhydrocinnamide); 1,6-hexamethylene-bis-(3,5-di-tert-butyl-4-hydroxyhydrocinnamate); 1,3,5-trimethyl-2,4,6-tris(3,5-di-tert-butyl-4-hydroxybenzyl)benzene; 2,4-bis-(n-octylthio)-6-(4-hydroxy-3,5-di-tert-butylanilino)-1,3,5-triazine; n-octadecyl 3,5-di-tert-butyl-4-hydroxyphenylacetate; 1,3,5-tris-(4-tert-butyl-3-hydroxy-2,6-dimethylbenzyl) 1,3,5-triazine-2,4,6-(1H, 3H, 5H)-trione; 2,2-methylenebis(4-ethyl-6-tert-butyl-phenol); 4,4-methylenebis(3,6-di-tert-butylphenol); 4,4-thiobis(6-tert-butyl-2-methylphenol); 3,1 condensate of 3-methyl 6-tert-butylphenol and crotonaldehyde, 4,4-butylidenebis(6-tert-butyl-m-cresol)-3,5-di-tert-butyl-4-hydroxybenzyl ether; 2,2-oxamido-bis-(ethyl-3(3,5-di-tert-butyl-4-hydroxylphenyl)-propionate. Stearyl β(3,5-di-tert-butyl-4-hydroxyphenol)propionate, distearyl 3methyl-4-hydroxy-5-tert-butylbenzyl malonate 4,4'-propylmethylene-bis(2-tert-butyl-5-methylphenol)2,2'-propylmethylenebis(4,6-di-methylphenol); 2,2-methylene-bis(4,6-di-tert-butylphenol); 1,4-bis(3',5'-di-tert-butyl-4'-hydroxybenzyl)-2,3,5,6-tetramethylbenzene; 1,1-bis(3'-cyclohexyl-4'-hydroxyphenyl)cyclohexane; 2,6-bis(2'-hydroxy-3'-tert-butyl-5-methylphenyl)-4-methylphenol; 2,4,6-tris-[β-(3,5-di-butyl-4-hydroxyphenyl)ethyl]-1,3,5-triazine; 2,4,6-tris(3',5'-di-tert-butyl-4-hydroxybenzyl)phenol, and pentaerythritol tetrakis(3,5-di-tert-butyl-4-hydroxyhydrocinnamate).

Phosphites and phosphonites include, for example, triphenyl phosphite, diphenylalkyl phosphites, phenyldialkyl phosphites, tri(nonylphenyl)phosphite, trilauryl phosphite, trioctadecyl phosphite, di-stearyl-pentaerythritol diphosphite, tris-(2,4-di-tert-butylphenyl) phosphite, di-isodecylpentaerythritol diphosphonite, tristearyl-sorbitol triphosphite, tetrakis-(2,4-di-tert-butylphenyl)-4,4'-diphenylylenediphosphonite.

The ultraviolet light absorbers useful in the present invention are compatible with polyesters and include 2-(2'-hydroxyphenyl)-benzotriazoles, for example, the 5'-methyl-, 3',5'-di-tert-butyl-, 5'-tert-butyl-, 5'-(1,1,3,3-tetramethylbutyl)-, 5-chloro-3',5'-di-tert-butyl-,5-chloro-3'-tert-butyl-5'-methyl-, 3'-sec-butyl-5'-tert-butyl-, 4'-octyloxy, 3',5'-di-tert-amyl-, 3',5'-bis-(α,α-dimethylbenzyl)-derivative;

2-Hydroxy-benzophenones, for example, the 4-hydroxy-, 4-methoxy-, 4-octyloxy, 4-decyloxy-, 4-dodecyloxy-, 4-benzyloxy, 4,2', 4'-trihydroxy- and 2'-hydroxy-4,4'-dimethoxy derivatives;

Esters of optionally substituted benzoic acids for example, phenyl salicylate, 4-tert-butyl-phenylsalicylate, octylphenyl salicylate, dibenzoylresorcinol, bis-(4-tert-butylbenzol)-resorcinol, benzoylresorcinol, 3,5-di-tert-butyl-4-hydroxybenzoic acid 2,4-di-tert-butyl-phenyl ester and 3,5-di-tert-butyl-4-hydroxybenzoic acid hexadecyl ester;

Acrylates, for example, α-cyano-β,β-diphenylacrylic acid ethyl ester or isooctyl ester, α-carbomethoxy-cinnamic acid methyl ester, α-cyano-βmethyl-p-methoxycinnamic acid methyl ester or butyl ester, α-carbomethoxy-p-methoxy-cinnamic acid methyl ester, and N-(β-carbomethoxy-β-cyano-vinyl)-2-methyl-indoline; and Oxalic acid diamides, for example, 4,4'-di-octyloxyoxanilide, 2,2'-di-octyloxy-5,5'-di-tert-butyl-oxanilide, 2-ethoxy-2'-ethyl-oxanilide, N,N'-bis(3-dimethylaminopropyl)-oxalamide, 2-ethoxy-5-tert-butyl-2'-ethyloxanilide and its mixture with 2-ethoxy-2'-ethyl-5,4'-di-tert-butyloxanilide and mixtures of ortho- and paramethoxy- as well as of o- and p-ethoxy-disubstituted oxanilides.

Of particular value in the instant compositions are the benzotriazoles of high molecular weight and low volatility such as 2-[2-hydroxy-3,5-di(alpha,alpha-di-methylbenzyl)-phenyl]-2H-benzotriazole, 2-(2-hydroxy-3,5-di-tert-octylphenyl)-2H-benzotriazole, 2-(2-hydroxy-3-alpha,alpha-dimethylbenzyl-5-tert-octyl-phenyl)-2H-benzotriazole, 2-(2-hydroxy-3-tert-octyl-5-alpha,alpha-dimethylbenzylphenyl)-2H-benzotriazole, 2-(2-hydroxy-3,5-di-tert-amylphenyl)-2H-benzotriazole, 2-[2-hydroxy-3-tert-butyl-5-(2-(omega-hydroxy-octa-(ethyleneoxy)carbonyl)-ethyl)phenyl]-2H-benzotriazole, dodecylate 2-(2-hydroxy-5-methylphenyl)-2H-benzotriazole and the 5-chloro compounds corresponding to each of the above named benzotriazoles.

Most preferably, the benzotriazoles useful in the instant compositions are 2-[2-hydroxy-3,5-di(alpha,alpha-dimethyl-benzyl)phenyl]-2H-benzotriazole and 2-[2-hydroxy-3-tert-butyl-5-(2-(omega-hydroxy-octa-(ethyleneoxy)-carbonyl)-ethyl)phenyl]-2H-benzotriazole.

The hindered amine light stabilizers (HALS) useful in this invention are based on the cyclic hindered amine compounds. Examples of these include 1,1'-[1,2-ethanediyl] bis[3,3,5,5-tetramethylpiperazinone] dimethylsuccinate polymer with 4-hydroxy-2,2,6,6-tetramethyl-1-piperidineethanol, bis(1,2,2,6,6-pentamethyl-4-piperidinyl)-sebacate, bis(2,2,6,6-tetramethyl-4-piperidinyl)decane-dioate; bis(1,2,2,6,6-pentamethyl-4-piperidinyl)-2-[[3,5-bis(1,1-dimethylethyl)-4-hydroxyphenyl]methyl]-2-butylpropanedioate; poly[(2,2,6,6-tetramethyl-4-piperidinyl)iminomethylene-(2,2,6,6-tetramethyl-4-piperidinyl)imino[6-(octylamino)1,3,5-triazine-4,2-diyl]]; 2,2,6,6-tetramethyl-4-piperidinyl benzoate; tetrakis(2,2,6,6-tetramethyl-4-piperidinyloxy)silane; and the like. Various HALS suitable for the polyesters of this invention are available commercially including Tinuvin 292, Tinuvin 622, Tinuvin 770 as well as Tinuvin 144, all of which are manufactured by Ciba-Geigy Corporation, Ardsley, N.Y.

A variety of pigments can be utilized in the compositions of this invention. Examples of the useful pigments are: metallic oxides, such as titanium dioxide, iron oxide, zinc oxide and the like; metal hydroxides, metal powders, sulfides, sulfates, carbonates, silicates such as aluminum silicate, carbon black, talc, china clay, barytes, iron blues, lead blues, organic reds, organic maroons and the like.

In addition to the essential components described above, compositions within the scope of the present invention can also include flow control agents, drying oils, degassing agents such as benzoin and fillers. Flow control agents, for example, include polymers such as polyalkyl acrylates and methacrylates.

Suitable curing or crosslinking agents for use with the instant polyesters are well known in the art. Typical curing agents include polyepoxides such as triglycidyl isocyanurate, solid blocked isocyanates, hydroxy alkyl amides, melamine derivatives, glycolurils, and other solid curing agents capable of reacting with carboxyl or hydroxyl functional groups. The curing agents are utilized in amounts ranging from 4 to 20%, by weight of polyester fomulation.

The powder components, e.g. resins, hardeners, fillers, pigments and additives, are premixed in a suitable blender (e.g. drum mixer). The premix is homogenized at elevated temperatures on a two-roll mill or in an extruder. The homogenized mix is then cooled, broken up, ground and sieved.

The powdered composition may be deposited on the substrate by use of a powder gun, by electrostatic deposition or by deposition from a fluidized bed or by other well-known methods of powder deposition. After deposition, the powder is heated to a temperature sufficient to cause its particles to flow and thus fuse together to form a smooth, uniform, continuous, uncratered coating on the substrate surface.

The following examples further illustrate the embodiments of the instant invention.

EXAMPLE I

Preparation of carboxyl-functional polyester

A mixture of 360.5 g (3.0 eq) hydrogenated bisphenol-A, 156 g (3.0 eq) neopentyl glycol, 25.8 g (0.57 eq) trimethylol propane and 674 g (7.1 eq) of 91% purity 1,4-cyclohexane dicarboxylic acid along with 3.03 g butyltin trioctanoate catalyst, 0.6 g triphenylphosphite and 1.2 g Irganox 1010 stabilizer is placed in a 2-liter four-neck round-bottom flask equipped with a stirrer, a distillation column connected to a water-cooled condenser, an inlet for nitrogen and a thermometer attached to a thermoregulator. The flask contents are heated under nitrogen with stirring to a temperature of ca. 135° C. at which point water is distilled from the flask. The heating is continued gradually to a temperature of 220° C. with connection to a vacuum system (~65 mm Hg). The final temperature recorded is 225° C. and the resin is discharged after releasing vacuum and cooling to 210° C.

The analytical properties obtained on the resin are as follows:

Acid No. (mg KOH/g)—52
Hydroxyl No. (mg KOH/g)—6.2
ICI Viscosity @ 200° C.—56 poise
Glass Transition Temp.—55.7° C.

EXAMPLE II

The polyester of Example I is then formulated into a powder coating composition by blending the ingredients noted in Table I on a two-roll mill at a temperature of 71° C. for 10 minutes. The material is ground in a pin-disc mill and sieved to a particle size no larger than 106 microns. The powder is applied to untreated, cold rolled steel panels by an electrostatic spray technique. The physical properties of the formulated powder coating composition are determined after a 20 minute cure at 200° C. for a 2.0±0.2 mil film thickness. These results are likewise noted in Table I.

The control polyester is a commercially available carboxyl-functional polyester which is noted for its advantageous performance characteristics on outdoor exposure.

Weathering measurements are conducted in a very severe environment, i.e. the QUV accelerated weathering tester (Q Panel Co.) which subjects coated specimens to the intermittent effects of condensation as well as the damaging effects of sunlight simulated by fluorescent UV lamps (FS-40 lamps). The results of this testing are presented in Tables II (60° Gloss) and III (% Gloss Retention).

TABLE I

CARBOXYL-FUNCTIONAL POLYESTER FORMULATIONS

| FORMULATION (WEIGHT %) | A | B | C | D | E |
|---|---|---|---|---|---|
| CONTROL[a] | — | — | — | 65 | — |
| POLYESTER I | 63 | 63 | 81.5 | — | 63 |
| TRIGLYCIDYL ISOCYANURATE | 7 | 7 | 9.0 | 5 | 7 |
| TITANIUM DIOXIDE | 28.5 | 19.9 | — | 28.5 | 17.6 |
| TINUVIN 144[b] | — | 3 | 3 | — | 3 |
| TINUVIN 900[c] | — | 5 | 5 | — | 5 |
| FLOW AID[d] | 1.5 | 1.5 | 1.5 | 1.5 | 1.5 |
| XB3126 CATALYST[e] | — | 0.6 | — | — | 3 |
| COATING PROPERTIES | | | | | |
| COLOR - L[f] | 95 | 90 | 18 | 96 | 94 |
| - a | −5 | −5 | 3 | −8 | −8 |
| - b | 2 | 2 | −1 | 2 | 3 |
| 60° GLOSS[g] | 84 | 85 | 119 | 86 | 84 |
| 20° GLOSS | 52 | 53 | 93 | 36 | — |
| DISTINCTION OF IMAGE[h] | 13 | 41 | 61 | 7 | 5 |
| ADHESION | EXC | EXC | EXC | EXC | EXC |
| PENCIL HARDNESS | H | H | H | H | H |
| MEK RUBS | 200+ | 200+ | 200+ | 200+ | 200+ |
| ⅛" MANDREL BEND[i] | FAIL | FAIL | FAIL | PASS | PASS |
| REVERSE IMPACT (in-lbs)[j] | <10 | <10 | <10 | 160+ | 80 |
| 200° C. GEL TIME (sec) | 210 | 193 | 300+ | 50 | 34 |
| GPF, 15' @176° C. (mm)[k] | 34 | 55 | 150 | 60 | 51 |

[a]ARAKOTE 3003, aromatic acid-based polyester (Ciba-Geigy Corp.)
[b]Hindered amine light stabilizer (Ciba-Geigy Corp.)
[c]U.V. light absorber (Ciba-Geigy Corp.)
[d]Modaflow II - a low molecular weight acrylic polymer (Monsanto Chemical Co.)
[e]Proprietary catalyst based on quaternary ammonium salt (Ciba-Geigy Corp.)
[f]COLOR GLOSS MULTIGLOSS BYKOMETER (BYK-CHEMIE)
[g]ASTM D 523
[h]ASTM E-430-78
[i]ASTM D 522
[j]ASTM D 2794
[k]Ciba-Geigy Test Method 298 (GLASS PLATE FLOW)

TABLE II

QUV HOURS VS 60° GLOSS

| HRS. | A | B | C | D |
|---|---|---|---|---|
| 0 | 86 | 87 | 108 | 94 |
| 100 | 87 | 87 | 111 | 95 |
| 200 | 86 | 87 | 110 | 93 |
| 300 | 87 | 88 | 107 | 78 |
| 400 | 84 | 88 | 107 | 40 |
| 500 | 81 | 88 | 103 | 26 |
| 600 | 77 | 88 | 105 | 24 |
| 700 | 71 | 90 | 102 | 30 |
| 800 | 68 | 90 | 106 | 23 |
| 900 | 60 | 89 | 105 | 24 |
| 1000 | 51 | 89 | 103 | 23 |
| 1100 | 51 | 87 | 101 | — |
| 1200 | 47 | 89 | 104 | — |
| 1300 | 48 | 84 | 100 | — |
| 1400 | 48 | 80 | 98 | — |
| 1500 | 46 | 78 | 97 | — |
| 1600 | 46 | 79 | 96 | — |
| 1700 | 40 | 72 | 93 | — |

TABLE III

QUV HOURS VS % GLOSS RETENTION

| HRS. | A | B | C | D |
|---|---|---|---|---|
| 100 | 100 | 100 | 100 | 100 |
| 200 | 100 | 100 | 100 | 99 |
| 300 | 100 | 100 | 99 | 83 |
| 400 | 98 | 100 | 99 | 43 |
| 500 | 94 | 100 | 95 | 28 |
| 600 | 89 | 100 | 97 | 26 |
| 700 | 83 | 100 | 94 | 32 |
| 800 | 79 | 100 | 98 | 24 |
| 900 | 70 | 100 | 97 | 26 |
| 1000 | 59 | 100 | 95 | 24 |
| 1100 | 59 | 100 | 94 | — |
| 1200 | 55 | 100 | 96 | — |
| 1300 | 56 | 97 | 93 | — |
| 1400 | 56 | 92 | 91 | — |
| 1500 | 53 | 90 | 90 | — |
| 1600 | 53 | 91 | 89 | — |
| 1700 | 47 | 83 | 86 | — |
| 3800 | — | 50 | 73 | — |
| 4600 | — | — | 69 | — |
| 5400 | — | — | 50 | — |

The results indicate that the powder coating formulations of the invention exhibit certain performance characteristics similar to those of the commercial system. However, it can be seen in the results of exposure in the QUV weatherometer that unstabilized Formulation A retains 50% of its original gloss up to 1700 hrs., Formulations B and C retain between 83-86% of their original gloss even after 1700 hours whereas Formulation D (Control) exhibits only 43% retention of original gloss after 400 hours exposure.

Thus, the aliphatic polyesters cured with triglycidyl isocyanurate with or without stabilizers provide unexpected resistance to the accelerated weathering encountered in the QUV testing procedure.

EXAMPLE III

A series of additional polyesters are prepared according to the procedure of Example I.

| Aliphatic Carboxyl Functional Polyesters | | | | | |
|---|---|---|---|---|---|
| | grams (equivalents) | | | | |
| Ingredients | 2 | 3 | 4 | 5 | 6 |
| 1,4-cyclohexane dicarboxylic acid | 626.1 (7.1) | 626.1 (7.1) | 626.1 (7.1) | 783 (8.3) | 626.1 (7.1) |
| neopentyl glycol | 78.0 (1.5) | 156.0 (3.0) | 156.0 (3.0) | 201.3 (3.9) | 156.0 (3.0) |
| hydrogenated bisphenol A | 360.5 (3.0) | 360.5 (3.0) | 180.3 (1.5) | — | — |
| 1,4-cyclohexane dimethanol | 108.0 (1.5) | — | 108.0 (1.5) | — | — |
| 2,2,4,4-tetramethyl-1,3-cyclobutanediol | — | — | — | 236.4 (3.3) | — |
| trimethylol propane | 25.8 (0.6) | — | 25.8 (0.6) | 25.8 (0.6) | 25.8 (0.6) |
| tricyclodecane dimethanol | — | — | — | — | 294.5 (3.0) |
| tris(2-hydroxyethyl)-isocyanurate | — | 49.9 (0.6) | — | — | — |
| Irganox 1010 | 0.6 | 0.6 | 0.6 | 0.6 | 0.6 |
| butyl tin tri-octanoate | 3.0 | 3.0 | 3.0 | 2.0 | 2.0 |
| Physical Properties | | | | | |
| Acid No. (mg KOH/g) | 52.9 | 46.9 | 41.5 | 42.2 | 38.7 |
| Tg (°C.) | 61.3 | 63.3 | 51.6 | 51.4 | 52.8 |
| ICI Viscosity @ 200° C. (poise) | 47 | 46.3 | 50 | 56.3 | 44.5 |

| | grams (equivalents) | | | | | |
|---|---|---|---|---|---|---|
| Ingredients | 7 | 8 | 9 | 10 | 11 | 12 |
| 1,4-cyclohexane dicarboxylic acid (98%) | 626 (7.14) | 626 (7.14) | 626 (7.14) | 574 (6.55) | 626 (7.14) | 626 (7.14) |
| Neopentyl glycol | 78.0 (1.5) | 156 (3.0) | 156 (3.0) | 156 (3.0) | 156 (3.0) | 156 (3.0) |
| Hydrogenated bisphenol A | 180.3 (1.5) | 180.3 (1.5) | — | 180.3 (1.5) | 360.5 (3.0) | 360.5 (3.0) |
| 1,4-cyclohexane dimethanol | 216 (3.0) | 108 (1.5) | — | 108 (1.5) | — | — |
| Trimethylol propane | — | — | 25.8 (0.57) | 15.0 (0.29) | 25.8 (0.57) | 25.8 (0.57) |
| Tris-(2-hydroxyethyl)isocyanurate | 49.9 (0.57) | 49.9 (0.57) | — | — | — | — |
| 1,4-Cyclohexanediol | — | — | 174 (3.0) | — | — | — |
| Irganox 1010 | 0.6 | 0.6 | 1.2 | 0.6 | 1.2 | 3.5 |
| Triphenylphosphite | — | — | 0.6 | 0.6 | — | 0.6 |
| Butyltin tris-2-ethylhexanoate | 3.0 | 3.0 | 3.0 | 3.0 | 3.0 | 3.0 |
| Physical Properties | | | | | | |
| Acid No. (mg KOH/g) | 50 | 44 | 54 | 32 | 51.6 | 53.6 |
| ICI @200° C. (poise) | 62.5 | 51 | 59.5 | 62.5 | 50 | 50.3 |
| Tg (DSC) | 58° C. | 55° C. | 51° C. | 51.3° C. | 58° C. | 63.7° C. |

| | grams (equivalents) | | | | |
|---|---|---|---|---|---|
| Ingredients | 13 | 14 | 15 | 16 | 17 |
| 1,4-cyclohexane dicarboxylic acid (98%) | 574 (6.55) | 626 (7.14) | 574 (6.55) | 574 (6.55) | 574 (6.55) |
| Neopentyl glycol | 156 (3.0) | 156 (3.0) | 156 (3.0) | 156 (3.0) | 156 (3.0) |
| Hydrogenated bisphenol A | 180.3 (1.50) | 360.5 (3.00) | 180.3 (1.50) | 180.3 (1.50) | 180.3 (1.50) |
| 1,4-cyclohexane dimethanol | 108 (1.50) | — | 108 (1.50) | 108 (1.50) | 108 (1.50) |
| Trimethylol propane | 15.0 (0.29) | 25.8 (0.574) | — | — | — |
| Tris-(2-hydroxyethyl)isocyanurate | — | — | 25.1 (0.289) | 25.1 (0.289) | 25.1 (0.289) |
| Irganox 1010 | 0.6 | 1.2 | 0.6 | 0.6 | 0.6 |
| Triphenylphosphite | 0.6 | 0.6 | 0.6 | 0.6 | 0.6 |
| Butyltin tris-2-ethylhexanoate | 3.0 | 3.0 | 3.0 | 3.0 | 3.0 |
| Phosphonium salt catalyst | 3.63 | 4.23 | — | 2.76 | 3.60 |
| Physical Properties | | | | | |
| Acid No. (mg KOH/g) | 28.2 | 52.8 | 32.2 | 32.2 | 32.2 |
| ICI @200° C. (poise) | 60 | 55.5 | 60 | 60 | 60 |

-continued

| Aliphatic Carboxyl Functional Polyesters | | | | | |
|---|---|---|---|---|---|
| Tg (DSC) | 54.5° C. | 63.8° C. | 50.2° C. | 50.2° C. | 58° C. |

| CLEAR AND PIGMENTED FORMULATION - TGIC BASED | | |
|---|---|---|
| Formulation | F | G |
| Polyester 5 | 61.8 | 88.3 |
| Triglycidyl Isocyanurate | 8.2 | 11.7 |
| TiO$_2$ | 20.5 | — |
| Flow Aid | 1.5 | 1.5 |
| Tinuvin 144 | 1.0 | — |
| Tinuvin 900 | 5.0 | — |
| Cure Schedule: | 20' @200° C. | |
| Mechanical Properties | | |
| Color  L | 92.8 | 26.8 |
| a | −3.1 | 7.2 |
| b | 3.0 | −3.9 |
| 60° Gloss | 86 | 105 |
| 20° Gloss | 61 | 74 |
| Image Distinction | 41 | 86 |
| Adhesion | exc | exc |
| Pencil Hardness | 3H | 4H |
| ⅛" Mandrel Bend | pass | pass |
| MEK Rubs | 200+ | 200+ |
| Reverse Impact (in-lbs) | 160 | 160 |
| Gel Time, 200° C. (sec) | 214 | 187 |
| GPF (mm) | 60 | 100+ |

| TGIC FORMULATIONS 93/7 AND 90/10 RATIO | | |
|---|---|---|
| Formulation | H | I |
| Polyester 13 | 65.0 | — |
| Polyester 14 | — | 63.0 |
| Triglycidyl Isocyanurate | 5.0 | 7.0 |
| TiO$_2$ | 28.5 | 28.5 |
| Flow Aid | 1.5 | 1.5 |
| Cure Schedule: | 20' @200° C. | |
| Mechanical Properties | | |
| Color  L | 94.6 | 94.2 |
| a | −0.29 | −1.07 |
| b | 0.04 | 1.8 |
| 60° Gloss | 85 | 86 |
| 20° Gloss | 52 | 61 |
| Image Distinction | 16 | 21 |
| Adhesion | exc | exc |
| Pencil Hardness | H | H |
| ⅛" Mandrel Bend | pass | pass |
| MEK Rubs | 150 | 200+ |
| Reverse Impact (in-lbs) | 160 | 160 |
| Gel Time, 200° C. (sec) | 30 | 31 |

HIGH DOI AND HIGH IMPACT

-continued

| TGIC FORMULATIONS | | | |
|---|---|---|---|
| Formulation | J | K | L |
| Polyester 15 | 65.0 | — | — |
| Polyester 16 | — | 65.0 | — |
| Polyester 17 | — | — | 65.0 |
| Triglycidyl Isocyanurate | 5.0 | 5.0 | 5.0 |
| TiO$_2$ | 28.5 | 28.5 | 28.5 |
| Flow Aid | 1.5 | 1.5 | 1.5 |
| Cure Schedule: | 20' @200° C. | | |
| Mechanical Properties | | | |
| Color  L | 94.6 | 94.3 | 94.4 |
| a | 0.11 | −0.46 | −0.61 |
| b | 0.4 | −0.11 | 0.06 |
| 60° Gloss | 86 | 85 | 86 |
| 20° Gloss | 70 | 60 | 62 |
| Image Distinction | 60 | 22 | 21 |
| Adhesion | exc | exc | exc |
| Pencil Hardness | H | H | H |
| ⅛" Mandrel Bend | fail ⅛" | pass | pass |
| MEK Rubs | <10 | 200+ | 200+ |
| Reverse Impact (in-lbs) | <10 | 160 | 160 |
| Gel Time, 200° C. (sec) | >300 | 71 | 40 |

These data illustrate the high distinction of image or high impact in these formulations based on carboxyl functional aliphatic polyesters and TGIC as the curing agent.

ALIPHATIC HYDROXYL FUNCTIONAL POLYESTERS

EXAMPLE IV

Preparation of Hydroxy-Functional Polyesters

The procedure of Example I is repeated utilizing the following components:

| | grams (equivalents) | | | | |
|---|---|---|---|---|---|
| Ingredients | 18 | 19 | 20 | 21 | 22 |
| 1,4-cyclohexane dicarboxylic acid (98%) | 577 (6.57) | 577 (6.57) | 571 (6.5) | 571 (6.5) | 580.6 (6.74) |
| Neopentyl glycol | 209 (4.02) | 194.7 (3.74) | 205 (3.94) | 205 (3.94) | 205 (3.94) |
| Hydrogenated bisphenol A | 313.5 (2.61) | 351 (2.93) | 337.3 (2.75) | — | — |
| Trimethylol propane | 31 (0.69) | 20 (0.444) | 27.1 (0.522) | 11.0 (0.244) | — |
| Tricyclodecane dimethanol | — | — | — | 277.4 (2.83) | 275.5 (2.81) |
| Tris-(2-hydroxy-ethyl)isocyanurate | — | — | — | — | 67.7 (0.778) |
| Irganox 1010 | 0.6 | 0.6 | 0.6 | 0.6 | 0.6 |
| Butyltin Tris-2-ethylhexanoate | 3.0 | 3.0 | 3.0 | 3.0 | 3.0 |
| Physical Properties | | | | | |
| Acid No. (mg KOH/g) | 6.5 | 6.0 | 5.5 | 2.30 | 2.0 |
| OH No. (mg KOH/g) | 32.8 | 34 | 33.5 | 17.8 | 30.4 |
| ICI @200° C. (poise) | 85.8 | 61 | 63.8 | 65 | 60 |
| Tg (DSC) | 56° C. | 61° C. | 55° C. | 47.6° C. | 48.3° C. |

HIGH IMPACT ALIPHATIC HYDROXYL FUNCTIONAL POLYESTER FORMULATION

EXAMPLE V

The procedure of Example II is utilized to generate the following data:

| Formulation | M |
|---|---|
| Polyester 22 | 60.9 |
| Caprolactam Blocked Isophoronediisocyanate | 9.1 |
| TiO₂ | 28.1 |
| Flow Aid | 1.5 |
| Dibutyl Tin Dilaurate | 0.4 |
| Cure Schedule: | 20' @200° C. |
| Mechanical Properties | |
| Color    L | 93.4 |
| a | −0.23 |
| b | 0.09 |
| 60° Gloss | 94 |
| 20° Gloss | 82 |
| Distinction of Image | 41 |
| Adhesion | exc |
| Pencil Hardness | 2H |
| ⅛" Mandrel Bend | pass |
| MEK Rubs | 80 |
| Reverse Impact (in-lbs) | 160 |
| Gel Time, 200° C. (sec) | 123 |

This series of data illustrates the excellent mechanical properties achieved with formulation M based on an aliphatic hydroxyl-terminated polyester.

What is claimed is:

1. An aliphatic polyester resin containing free carboxyl groups or free hydroxyl groups comprising the reaction product of
   (a) 1,4-cyclohexane dicarboxylic acid as the acid component, and
   (b) as the alcohol component, 12–100 equivalent % of hydrogenated bisphenol A, a cycloaliphatic diol or mixtures thereof and (c) 0–88 equivalent % of at least one branched chain glycol or polyol of 2–10 carbon atoms.

2. The polyester resin of claim 1, wherein component (b) is selected from the group consisting of hydrogenated bisphenol A, 2,2,4,4-trimethyl-1,3-cyclobutanediol, tricyclodecane dimethanol, 1,4-cyclohexanedimethanol, 1,4-cyclohexanediol and mixtures thereof.

3. The polyester resin of claim 2, wherein component (b) is hydrogenated bisphenol A.

4. The polyester resin of claim 1, wherein component (c) is selected from the group consisting of ethylene glycol, diethylene glycol, propylene glycol, butylene glycol, 1,6-hexanediol, neopentyl glycol, trimethylolpropane, tris(2-hydroxyethyl)isocyanurate, trimethylolethane, and mixtures thereof.

5. The polyester resin of claim 4, wherein component (c) is a mixture of neopentyl glycol and trimethylolpropane.

6. The polyester resin of claim 1, wherein component (b) is hydrogenated bisphenol A and component (c) is a mixture of neopentyl glycol and trimethylol propane.

7. The polyester resin of claim 1 which contains free carboxyl groups resulting from the reaction with a 2–15 equivalent % stoichiometric excess of component (a).

8. The polyester resin of claim 1 which has an acid number of 15–60 or a hydroxyl number of 15–60 and a melt viscosity of 15–100 poise at 200° C.

9. The polyester resin of claim 1 which has a glass transition temperature of 45°–70° C.

10. The polyester resin of claim 1 which contains free hydroxy groups resulting from the reaction with a 2–15 equivalent % stoichiometric excess of components (b) and (c).

11. A weatherable thermosetting composition comprising (a) the polyester resin of claim 1, (b) a curing agent reactive with the carboxyl groups or with the hydroxyl groups to crosslink said polyester and (c), optionally an effective stabilizing amount of at least one stabilizer selected from the group consisting of ultraviolet light absorbing compounds and hindered amine light stabilizers.

12. The composition of claim 11, wherein said polyester resin contains free carboxyl groups.

13. The composition of claim 12, wherein said curing agent is a polyepoxide resin.

14. The composition of claim 13, wherein said curing agent is triglycidyl isocyanurate.

15. The composition of claim 11, wherein said polyester resin contains free hydroxyl groups.

16. The composition of claim 15, wherein said curing agent is an aliphatic isocyanate.

17. The composition of claim 11, wherein said light stabilizer is selected from the group consisting of benzotriazoles, benzophenones, benzoic acid esters, acrylates, oxalic acid diamides, hindered amines and mixtures thereof.

18. The composition of claim 17, wherein said light stabilizer is a mixture of benzotriazoles and hindered amines.

* * * * *